United States Patent
Danielson et al.

(10) Patent No.: US 6,901,947 B2
(45) Date of Patent: Jun. 7, 2005

(54) RAPID EVACUATION AND CHARGING SYSTEM, AND APPARATUS AND METHODS RELATING THERETO

(75) Inventors: Robert B. Danielson, Ham Lake, MN (US); Stanlee W. Meisinger, Golden Valley, MN (US)

(73) Assignee: Fastest Inc., St. Paul, MN (US)

( * ) Notice: Subject to any disclaimer, the term of this patent is extended or adjusted under 35 U.S.C. 154(b) by 274 days.

(21) Appl. No.: 10/005,965

(22) Filed: Nov. 8, 2001

(65) Prior Publication Data

US 2002/0096209 A1 Jul. 25, 2002

Related U.S. Application Data

(60) Provisional application No. 60/246,796, filed on Nov. 8, 2000.

(51) Int. Cl.[7] .......................... B23P 19/04; F16K 43/00
(52) U.S. Cl. ................. 137/315.41; 29/213.1; 29/221.6; 62/77; 62/292; 62/293; 137/15.18; 137/315.11; 137/454.5
(58) Field of Search .......................... 29/213.1, 221.5, 29/221.6, 237, 890.121; 62/77, 292, 293; 137/15.17, 15.18, 315.41, 454.2, 454.5, 454.6, 320, 322, 315.11; 251/149.6

(56) References Cited

U.S. PATENT DOCUMENTS

| | | | |
|---|---|---|---|
| 2,006,712 A | 7/1935 | Forbes et al. | |
| 2,170,478 A | 8/1939 | Long et al. | |
| 2,524,951 A | 10/1950 | Ashton | |
| 2,594,641 A | 4/1952 | Griffith et al. | |
| 2,645,451 A | 7/1953 | Gladden | |
| 2,928,417 A | 3/1960 | Buckner et al. | |
| 3,083,723 A | 4/1963 | Duchin et al. | |
| 3,419,040 A | 12/1968 | Thibodeaux | |
| 3,756,273 A | 9/1973 | Hengesbach | |
| 3,800,824 A | 4/1974 | Medina | |
| 3,916,947 A | 11/1975 | Holmes et al. | |
| 3,995,658 A | 12/1976 | Hager | |
| 4,026,320 A | 5/1977 | Grahl | |
| 4,182,370 A | * 1/1980 | Karcher | 137/614.04 |
| 4,506,695 A | 3/1985 | Kuypers | |
| 4,644,973 A | 2/1987 | Itoh et al. | |
| 4,979,721 A | 12/1990 | Gilbert | |
| 5,067,521 A | 11/1991 | Jenks et al. | |
| 5,139,049 A | 8/1992 | Jensen et al. | |
| RE34,781 E | * 11/1994 | Spalink et al. | 137/614.05 |
| 5,396,774 A | 3/1995 | Hubbell, Jr. | |
| 5,803,108 A | * 9/1998 | Schuessler et al. | 29/221.5 |
| 6,039,303 A | 3/2000 | Danielson et al. | |
| 6,050,295 A | 4/2000 | Meisinger et al. | |
| 6,073,974 A | 6/2000 | Meisinger et al. | |

FOREIGN PATENT DOCUMENTS

| | | |
|---|---|---|
| FR | 1512786 | 1/1968 |
| GB | 1123159 | 8/1968 |

OTHER PUBLICATIONS

"From leak detection through evacuation and charging . . . How to make your total job easier, faster and more effective," *Ritchie Engineering Company Inc.*, Edition 45a, 4 pgs (© 1995).

"Robinair, World Choice Tools And Equipment For The HVAC/R Service Professional," *Robinair Division, SPX Corporation*, 3 pgs. (© 1996).

\* cited by examiner

*Primary Examiner*—George L. Walton
(74) *Attorney, Agent, or Firm*—Merchant & Gould P.C.

(57) ABSTRACT

A system for performing rapid charging and evacuation of systems that contain a fluid, such as cooling systems on refrigeration products. In addition, the invention relates to methods of accomplishing rapid charging and evacuation, as well as to tools that form part of the system and that are used to accomplish the methods.

30 Claims, 19 Drawing Sheets

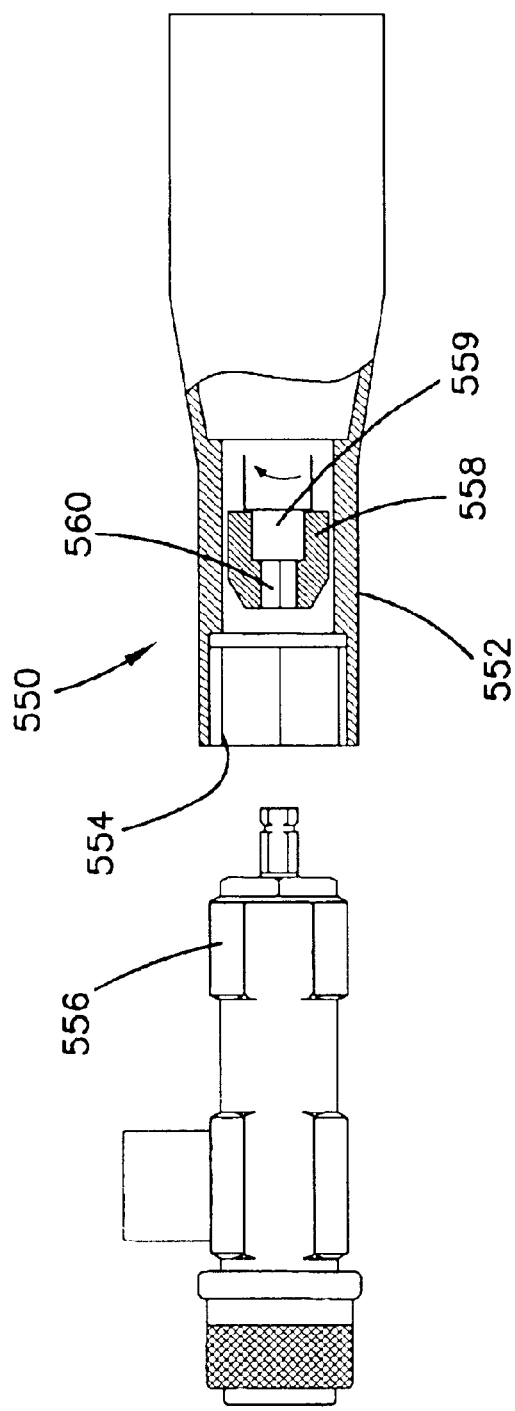
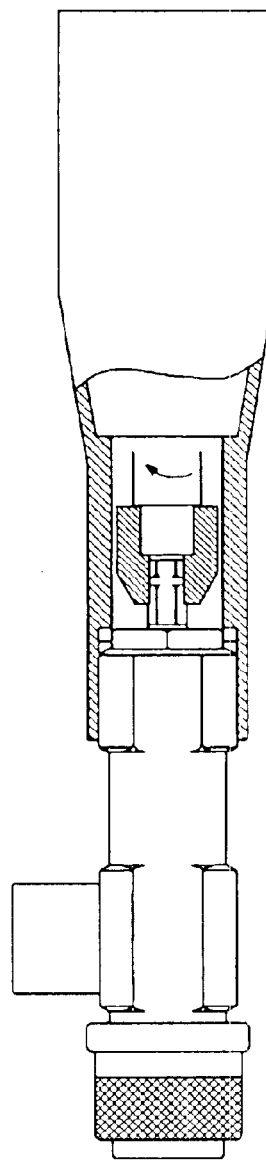
FIG. 12A
FIG. 12B

RAPID EVACUATION AND CHARGING SYSTEM, AND APPARATUS AND METHODS RELATING THERETO

This application claims the benefit of U.S. Provisional Application No. 60/246,796, filed Nov. 8, 2000.

FIELD OF THE INVENTION

The present invention relates generally to refrigeration systems, such as air conditioning units, refrigerators, and like products that utilize a refrigerant for cooling. More particularly, the present invention relates to a system to achieve rapid charging and/or evacuation of such systems, as well as to apparatus and methods relating thereto.

BACKGROUND OF THE INVENTION

Refrigeration products, such as air conditioning units and the like, employ a refrigerant contained in a closed loop system to provide cooling. Access to the closed loop system is commonly provided by a service connection, or service valve block. The service connection is valved to permit charging, evacuation, and/or testing of the closed loop system for a variety of purposes by manufacturing personnel during manufacture or by service personnel in the field.

A desirable feature of a service connection valve of a refrigeration product is the ability to permit high flow rates both into the closed loop system during charging as well as high flow rates out of the closed loop system during evacuation. In addition to permitting high flow rates, the valve should also be replaceable in the event of a failure of one or more of the valve components, such as a seal.

FIG. 1 illustrates a typical process that the cooling system of a refrigeration product undergoes during manufacturing. The system is first pressurized for testing purposes, during which a burst test followed by a leak test are performed. The tests can be performed either at a single testing station, or at separate stations. A typical total testing time takes from about 2 to about 5 minutes. After testing, the system is vented to atmosphere, followed by an evacuation. Evacuation typically takes from about 10 to about 30 minutes. Once evacuation is complete, the system is charged, which typically takes about 2 minutes, followed by another leak test during which the system is checked for leaks, and a subsequent run test. Each processing phase is often performed at a separate station, or one or more processing phases are performed at a single station. As evident from FIG. 1, the evacuation phase accounts for the largest percentage of the total processing time, and any reduction in evacuation time, thereby reducing the total processing time, would be beneficial. Any reduction in the other processing phase times would also be beneficial.

In addition, service personnel in the field access the cooling system of the refrigeration product through the service connection valve, typically for charging or evacuation of the cooling system. A reduction in charging or evacuation time would also benefit service personnel as well.

High flow valves having high flow rates are disclosed in U.S. Pat. No. 6,050,295. This patent also discloses a service connection that utilizes a valve core, often called a schrader valve, for controlling access to a closed loop cooling system of a refrigeration system. As described in the patent, the flow rate provided by a schrader valve core is generally lower than the flow rates provided by the high flow valves disclosed in the patent. It is expected that the valves described in U.S. Pat. No. 6,050,295, when used on a refrigeration product, would permit a reduction in one or more of the processing phase times during manufacturing, as well as reducing charging and evacuation times for service personnel.

Manufacturing and service personnel also rely upon a variety of tools during manufacturing and servicing to connect with a service connection valve to provide access to the cooling system in order to conduct each processing phase. For example, valve core removal tools for removing and/or inserting schrader valve cores are available from Robinair of Montpelier, Ohio. These valve core removal tools utilize a screw thread coupling mechanism at one end thereof that screws onto threads on the schrader valve body for connecting the tool to the valve. However, it is expected that improved tooling will also facilitate the manufacturing and service processing phases.

There is a need for improvements in the manufacturing and service processes on refrigeration systems to reduce the overall time of the processes, as well as to make such processes easier on manufacturing and service personnel.

SUMMARY OF THE INVENTION

The invention provides a system for performing rapid charging and evacuation of systems that contain a fluid, such as cooling systems on refrigeration products. In addition, the invention relates to methods of accomplishing rapid charging and evacuation, as well as to tools that form part of the system and that are used to accomplish the methods.

In one aspect of the invention, a system for charging or evacuating a closed loop fluid system comprises a service connection valve adapted to be connected to the system. The service connection valve includes a valve seat adapted to be fixed to the system and a valve core that is adapted to be removably connectable to the valve seat. The system further includes a service tool that is connectable with the valve seat and which includes a port through which charging or evacuating operations can occur.

In another aspect of the invention, a method for charging or evacuating a closed loop fluid system is provided. The method includes attaching a service connection valve to the system, where the service connection valve includes a valve seat fixed to the system and a valve core that is removably connected to the valve seat. The method further includes removing the valve core from the valve seat, and charging or evacuating the system through the valve seat.

In another aspect of the invention, a tool to insert or remove a valve core into or from a valve seat is provided. The tool comprises a generally hollow body having an open end, a closed end, and a port positioned between the open and closed ends that can be placed in flow communication with the open end. Means adjacent the open end of the body releasably connects the body to the valve seat, and a socket within the body holds and retains the valve core. The socket is mounted for movement within the hollow body along a longitudinal axis of the body between a first position adjacent the open end and a second position adjacent the closed end of the body.

In yet another aspect of the invention, a coupling for conducting servicing operations through a valve seat is provided. The coupling comprises a body having first and second open ends and a flow path extending through the body between the first and second ends. Means associated with the first open end of the body releasably connects the body to the valve seat, and a valve associated with the second open end of the body controls flow through the second open end.

In still another aspect of the invention, a tool that is attachable to a pneumatic gun for inserting or removing a valve core into or from a valve seat is provided. The tool comprises a holding head with a first end adapted to connect to a housing of the pneumatic gun and a second end formed with an internal hex. The tool also includes a drive head disposed within the holding head. The drive head includes a first end adapted for connection to a drive element of the pneumatic gun and a second end provided with a socket for driving the valve core.

A variety of additional advantages of the invention will be set forth in part in the description which follows, and in part will be apparent from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

FIGS. 12A–B illustrate a torque tool operating with the core insertion or removal tool.

DETAILED DESCRIPTION OF THE PREFERRED EMBODIMENTS

The invention relates to systems and methods for rapid evacuation, charging and/or testing of a system, such as a cooling system of a refrigeration product including air conditioning units, refrigerators and the like. The invention also relates to tooling used in such systems, as well as to methods relating thereto. The systems, methods and tooling aid both manufacturing and service personnel in performing evacuation, charging and testing operations.

The term "charging" as used herein includes the addition of a fluid into the system, whether the system is either completely empty of fluid or already contains fluid. The term "evacuation" as used herein includes the removal of portions of the fluid, or the entire amount of fluid, from the system. The term "testing" can include either charging or evacuation, as well as interactions with the system, such as pressure testing, whereby no fluid is added or removed. The term "processing" is meant to encompass charging, evacuation, testing and like interactions with the system.

Service Connection Valves

Figure 2:
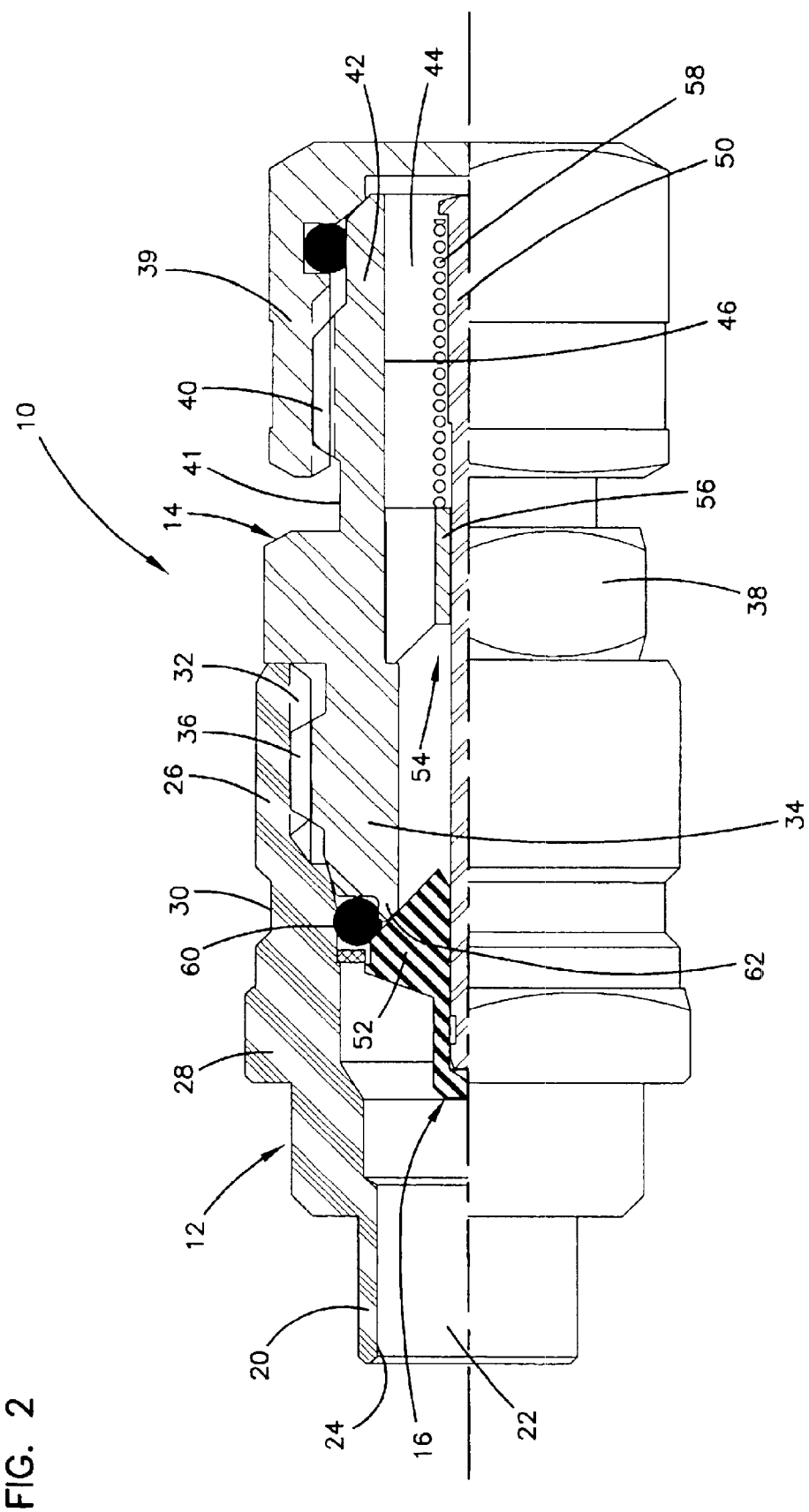
FIG. 2 is a partial cross-sectional view of a high flow service connection valve.

With reference to FIG. 2, one embodiment of a service connection valve 10 is illustrated. This valve is similar to valves disclosed in U.S. Pat. No. 6,050,295 and U.S. application Ser. No. 09/975,911 filed on Oct. 11, 2001 (now abandoned), which claims priority from U.S. Provisional Application No. 60/241,758, the disclosures of which are incorporated herein by reference.

The valve 10 is comprised of three primary components: a valve seat 12, a valve body 14, and a valve assembly 16. The valve seat 12 and valve body 14, which are formed from a metal such as brass, cooperate together to define a flow path through which a fluid, such as a refrigerant, is able is flow. The valve assembly 16 controls fluid flow through the valve 10. The valve body 14 and valve assembly 16 together form what will be referred to as a core 17 which can be removed from the seat 12.

The valve seat 12 is generally cylindrical and includes a first end region 20 that is illustrated as having a diameter that is reduced compared with the remainder of the valve seat. It is to be realized that the end region 20 could have a diameter that is about equal to, or greater than, the remainder of the valve seat 12, the diameter of the end region 20 being dependent upon the system to which the valve seat connects to. In the preferred use, the valve seat 12 is fixed to the refrigeration product in fluid communication with its closed loop cooling system by suitably securing the end region 20 to the refrigeration product, such as by brazing or welding, or by using threads. A central passage 22 defined by an interior wall 24 of the valve seat 12 extends from the first end region 20 to a second end region 26 of the valve seat. The seat 12 includes a hex head 28 formed thereon, and a cylindrical detent groove 30 is provided to facilitate engagement by a connector, such as a latching ball connector. Moreover, the interior wall 24 of the seat 12 is provided with threads 32 adjacent the end region 26.

The valve body 14 is also generally cylindrical, and includes an end region 34 that in use is disposed within the end region 26 of the seat 12. The end region 34 is provided with threads 36 that engage with the threads 32 on the seat 12 whereby the valve body 14 can be secured to, and detached from, the seat 12. A hex head 38 is also formed on the valve body 14 and abuts against the end region 26 of the seat 12 to limit insertion of the valve body. Threads 40 on the exterior surface of the valve body 14 permit screwing of an end cap 39 onto an end region 42 of the valve body. The valve body 14 further includes a channel 41 defined behind the threads 40.

A central passage 44 defined by an interior wall 46 of the valve body 14 extends from the end region 34 to the end region 42 of the valve body. The passage 44 is aligned with the passage 22 in use and the two passages 22, 44 combine to form a flow path for fluid through the valve 10.

The valve assembly 16 is supported within the body 14 so as to form a part thereof such that when the body 14 is removed from the seat 12, the valve assembly is removed therewith. The valve assembly 16 includes an elongated valve stem 50 extending through the passage 44 parallel to the longitudinal axis thereof and a valve head 52 is secured to one end of the valve stem.

A spacer 54 is fixed within the passage 44 for slideably supporting the valve stem 50 to allow opening and closing movements of the valve stem and head. The spacer 54 includes a central sleeve 56 through which the valve stem 50 extends, and a plurality of spacer arms are circumferentially spaced around the sleeve 56 and extend toward the interior surface of the body 14 for supporting the central sleeve. There are preferably two or three of the spacer arms in order to provide adequate support for the central sleeve 56. The spacer 54 can either be removably or non-removably mounted in the passage 44.

A coil spring 58 surrounds the valve stem 50 and is engaged between the sleeve 56 and an enlarged end of the valve stem so as to bias the valve head 52 into sealed engagement with a seal 60, as well as with a lip 62 on the valve body 14 to provide a metal to metal seal as a back-up to the seal 60. Thus, flow through the valve 10 is prevented until the valve stem is biased, against the bias of the spring 58, to unseat the valve head.

Figure 3:
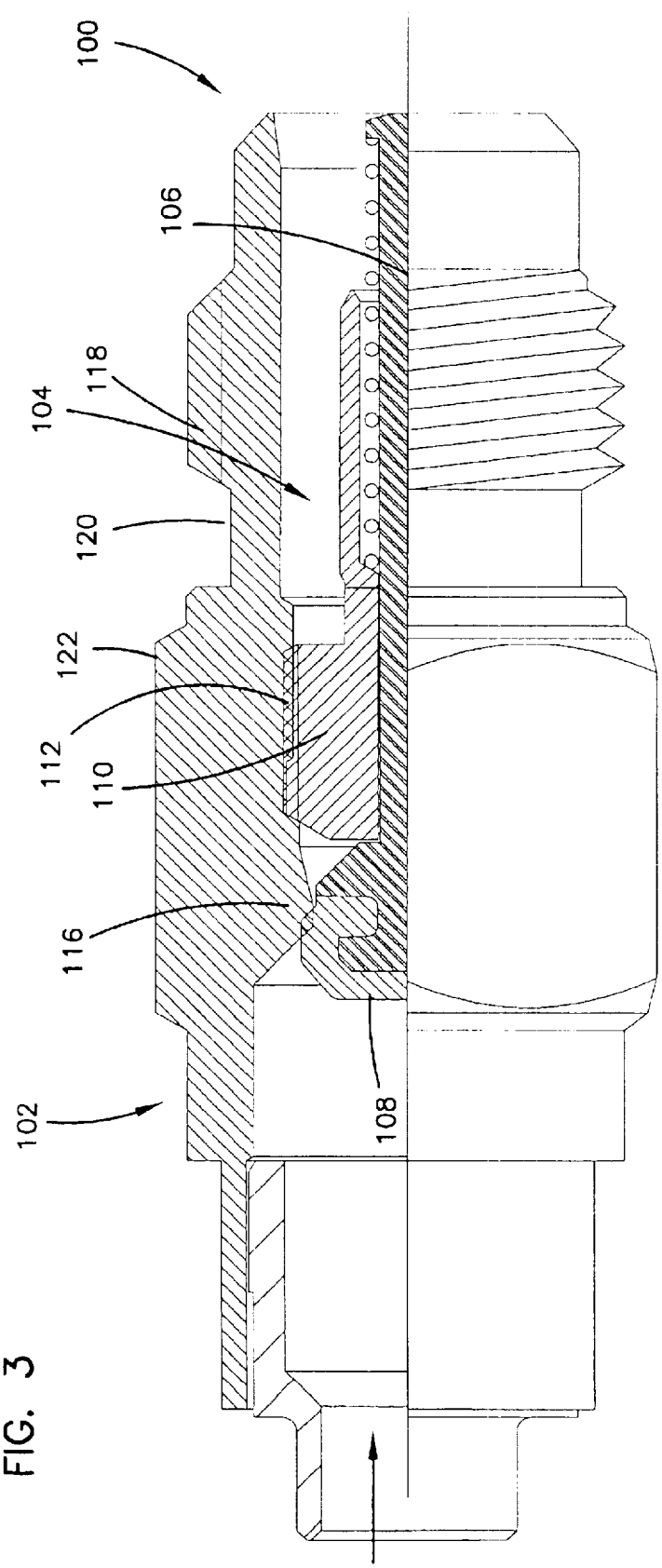
FIG. 3 is a cross-sectional view of a second embodiment of a high flow service connection valve.
Figure 4:
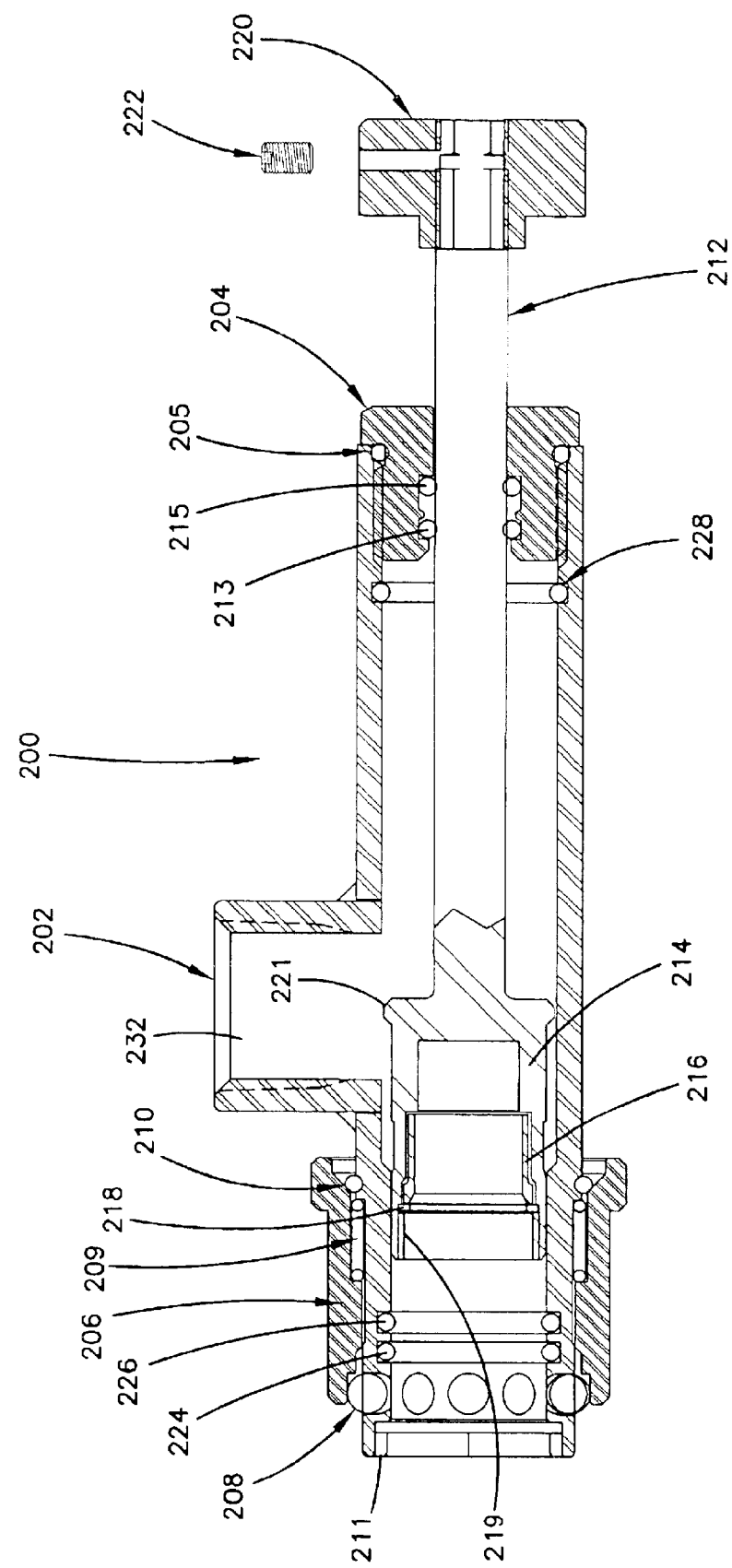
FIG. 4 is a cross-sectional view of a tool for inserting a core into or removing a core from the service connection valve of FIG. 2.

With reference to FIG. 3, a second embodiment of a service connection valve 100 is illustrated. The service connection valve 100 utilizes a one-piece valve body 102 rather than a separate valve seat and valve body as in FIG. 2. Service connection valves using a one-piece body are disclosed in U.S. Pat. No. 6,050,295 and U.S. application Ser. No. 09/975,911 (now abandoned), which claims priority from U.S. Provisional Application No. 60/241,758, the disclosures of which are incorporated herein by reference.

The exterior construction of the one-piece body 102 is similar to exteriors of the valve seat 12 and valve body 14 of FIG. 2. A valve assembly 104 is supported within the one-piece body 102 for controlling flow therethrough. The valve assembly 104 in this embodiment forms what will be referred to as a core 105, which can be removed from the body 102, with the body 102 forming what can be referred to as a valve seat for the core 105. The valve assembly 104 includes a valve stem 106, a valve head 108 and a spacer 110.

The arms of the spacer 110 are formed with threads, that are designed to engage with a threaded section 112 formed on the interior wall of the one-piece body 102 adjacent to a reduced diameter valve seat portion 116. The valve assembly 104, via the spacer 110 and the threads 112, can thus be inserted into and removed from the body 102.

The body 102 also includes a threaded section 118 and a circumferential detent groove or channel 120 defined between the threaded section 118 and a hex head 122. A latching connector can latch onto the body 102 by engaging with the channel 120 or with the threads of the threaded section 118.

As used herein, the term "latching connector" refers to a connector that is designed to latch or clamp onto the seat 12 or body 102 to securely hold the tool to the seat 12 or body 102. Examples of latching connectors include latching ball connectors, examples of which are disclosed in U.S. Pat. Nos. 6,039,303 and 6,073,974, and split collet connectors, an example of which is disclosed in U.S. Pat. No. 6,039,303. A latching ball connector will interact with the circumferential detent groove provided in the seat 12 or body 102, while a split collet connector will interact with or slightly behind threads provided on the exterior surface of the seat 12 or body 102.

Core Insertion/Removal Service Tool

FIGS. 4 and 5A–E illustrate a service tool 200 that is used to insert a core, i.e. valve body 14 and valve assembly 16, into the valve seat 12 of the valve 10 in FIG. 2. The tool 200 can also be used to remove the core from the valve seat 12, particularly when the system to which the valve 10 is connected is not pressurized. The tool 200 includes a generally cylindrical, hollow body 202, that is open at one end, and at the opposite end is closed by a cap 204 that is preferably threaded into the end of the body 202. An o-ring 205 seals between the cap 204 and the body 202.

A connection means to permit connection to the valve seat 12 is disposed adjacent the open end of the body 202. In the preferred embodiment, the connection means comprises a cylindrical sleeve 206 that is slidably disposed on the end region of the body 202. A plurality of balls 208 are disposed within circumferentially spaced holes formed in the end region of the body 202, and are actuated by the sleeve 206 in known fashion to connect to the seat 12. The sleeve 206 is biased by a spring 209 toward a direction in which the balls are forced by the sleeve 206 down into their respective holes. A retaining ring 210, disposed around the body 202, limits the rearward movement of the sleeve 206 on the body. The interior of the body 202 is provided with a hex 211 that is designed to engage with the hex head 28 on the valve seat 12.

A shaft 212 slidably and rotatably extends through the cap 204 and into the hollow body 202. A pair of o-rings 213, 215 seal between the shaft 212 and the cap 204. One end of the shaft 212 is formed into, or has connected thereto, a socket 214. Disposed within the socket 214 is a split collet core retainer 216 that is retained within the socket by a clip 218. Further, the interior of the socket 214 adjacent the open end thereof is formed into an internal drive hex 219 to engage a hex head on the valve core, and the closed end of the socket 214 is provided with an exterior raised shoulder 221.

The opposite end of the shaft 212 has connected thereto a knob 220 using a set screw 222 or the like. Moreover, a pair of seals 224, 226 are disposed within circumferential grooves formed in the inner surface of the body adjacent the balls 208, and a locking o-ring 228 is disposed within a circumferential groove formed in the inner surface of the body 202 adjacent the cap 204.

Figure 5A:
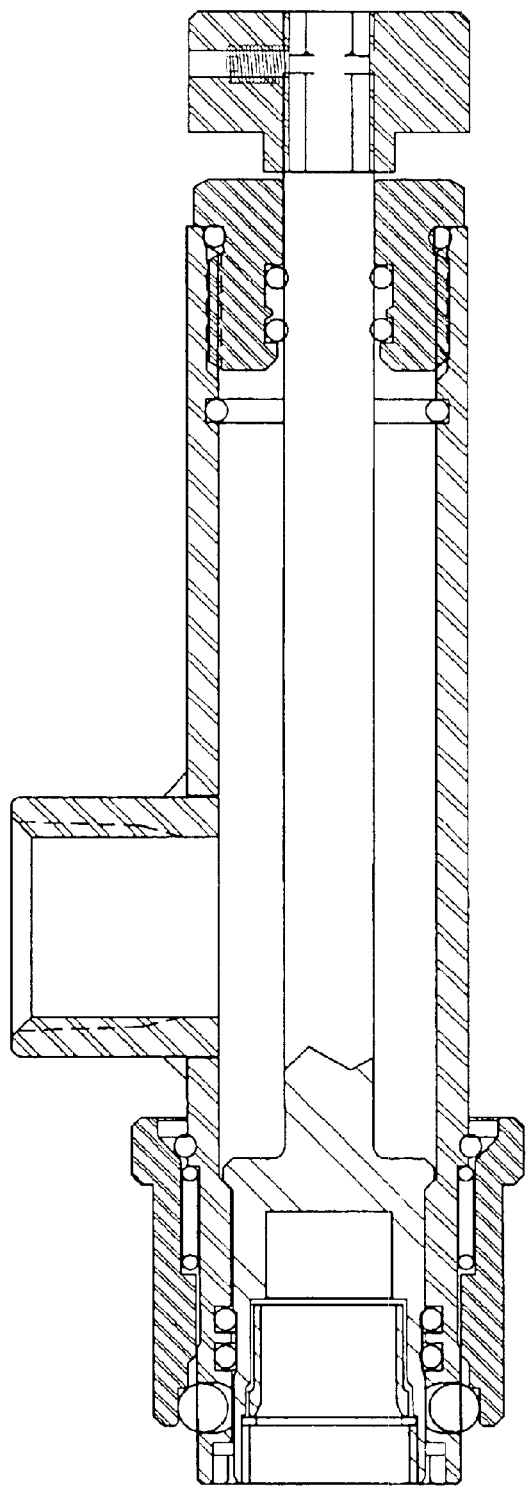
FIGS. 5A–E illustrate the operation of the insertion tool.
Figure 5B:
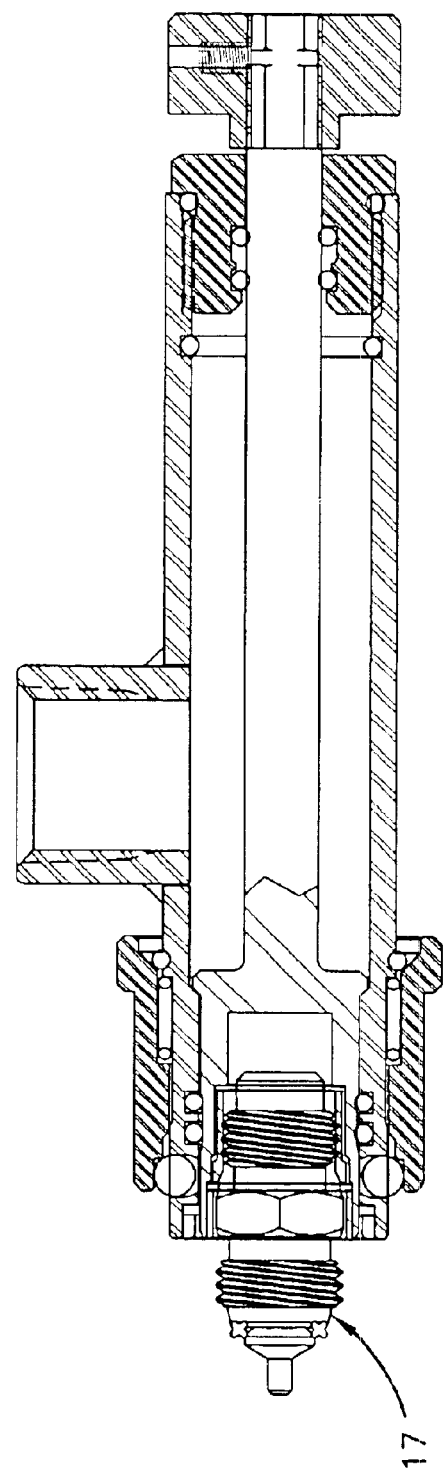
Figure 5C:
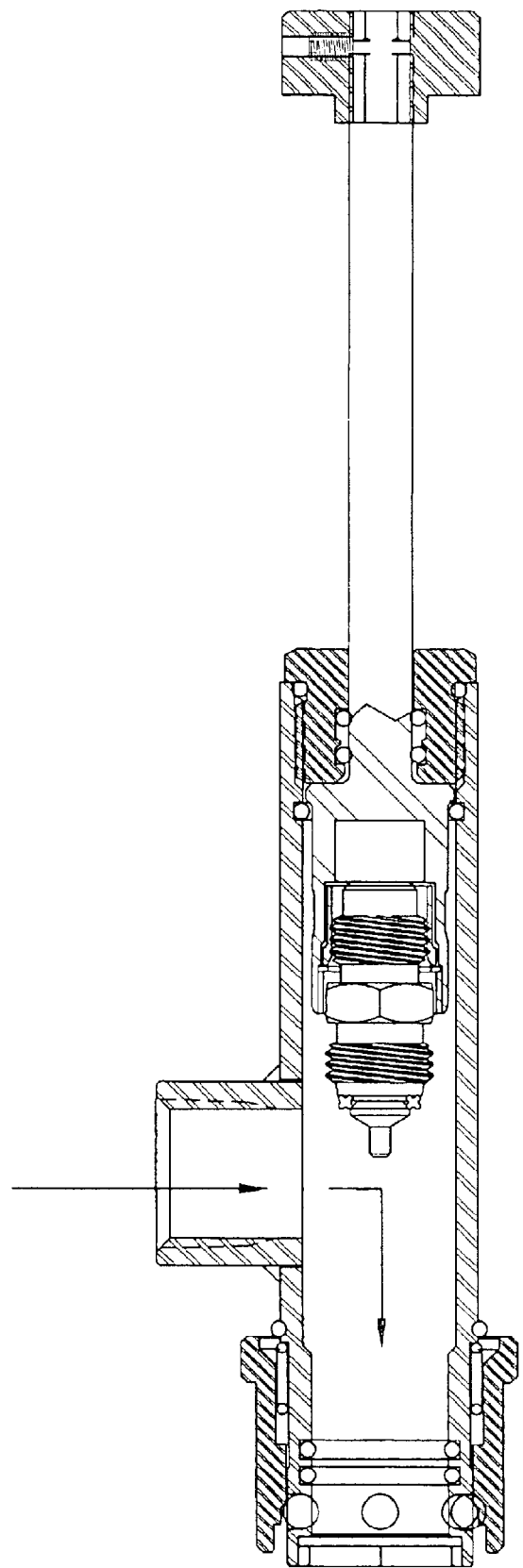
Figure 5D:
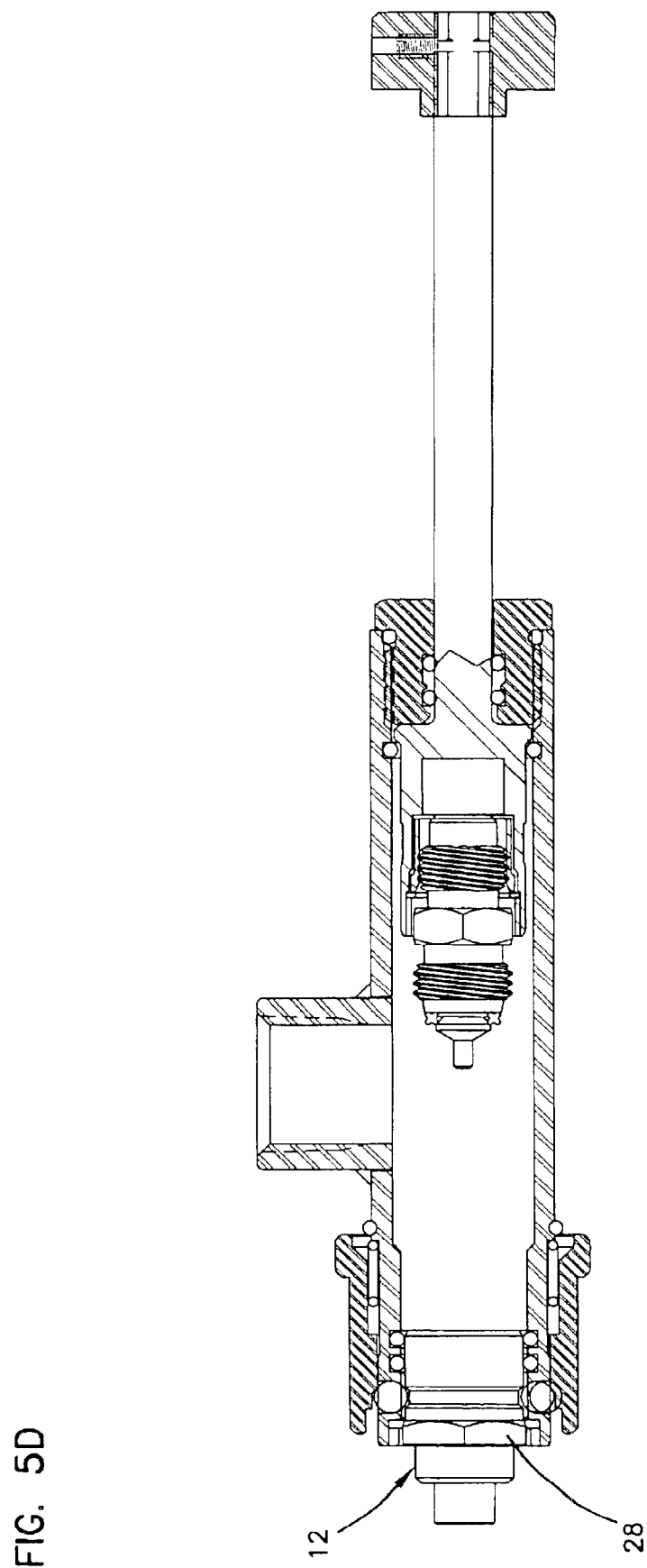
Figure 5E:
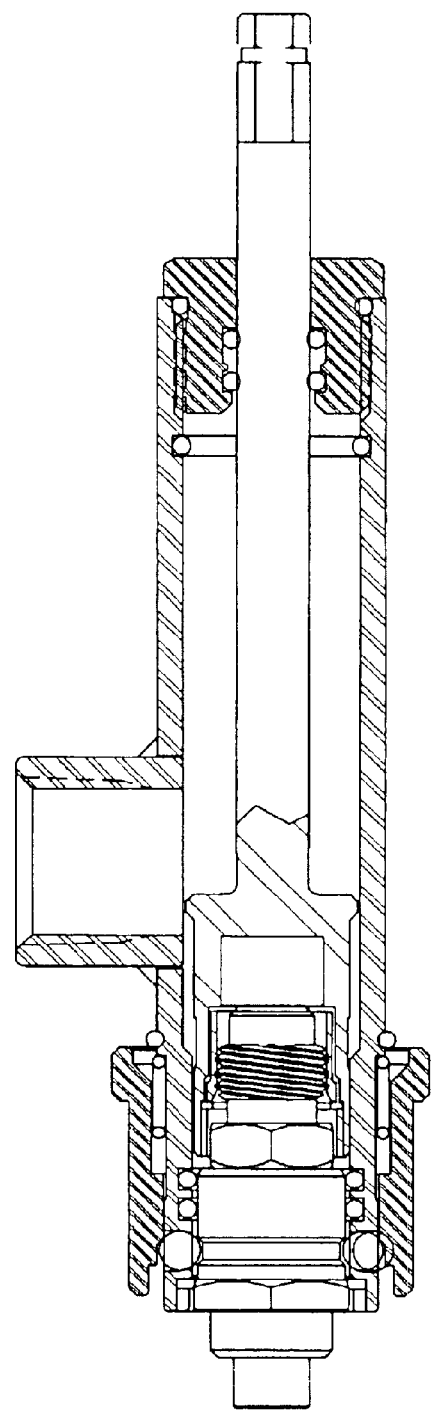

The operation of the tool 200 to insert a core is as follows. The sleeve 206 is initially biased forward up against the balls 208 by the spring 209. With reference to FIG. 5A, the sleeve 206 is pulled back and the shaft 212 is pushed completely forward, thereby exposing the collet 216 and the drive hex 219. The core (i.e. the valve body 14 and valve assembly 16) that is to be torqued into the seat is then inserted into the socket 214 by hand or otherwise, with the core being retained by the collet 216 and the drive hex 219 engaging the hex head 38 on the valve body 14, as illustrated in FIG. 5B. The shaft 212 is then pulled back, as shown in FIG. 5C, and the shaft is held in this position by the shoulder 221 and locking o-ring 228. Referring to FIG. 5D, the tool 200 is then attached to the valve seat 12 by pulling back on the sleeve 206 and allowing the balls 208 to move over the outer diameter of the seat 12 until they reach, and are forced into, the detent groove 30 on the seat by releasing the sleeve 206. The seals 224, 226 seal with the exterior surface of the seat 12 to prevent leakage. Finally, the core is torqued into the seat 12 by pushing the shaft 212 forward and threading the core into the seat, as illustrated in FIG. 5E. Core removal should be apparent from the description of the core insertion.

During use of the tool 200, the hex 211 engages the hex head 28 on the seat 12 and the drive hex 219 engages the hex head 38. As a result, the seat 12 is held by the body 202 and prevented from rotating as the core 17 (i.e. the body 14 and valve assembly 16) is inserted into (or removed from) the seat 12.

The body 202 is shown in the figures as including a port 232 through which a fluid can flow either into or out of the body. The port 232 allows the tool 200 to be connected to the seat 12 and thereafter for processing (i.e. evacuation, charging, testing, etc.) to occur through the tool 200. Processing would normally occur after the tool 200 is connected to the seat 12 and the shaft 212 has been pulled backward as shown in FIG. 5D. Once processing is completed, the shaft is pushed forward (see FIG. 5E), and the core inserted into the seat to thereby close the system. FIG. 5E illustrates the knob 220 as being removed from the shaft 212. Removal of the knob 220 permits the use of a tool, such as the torque tool later described herein, to be used to torque the core into the valve seat.

Figure 13A:
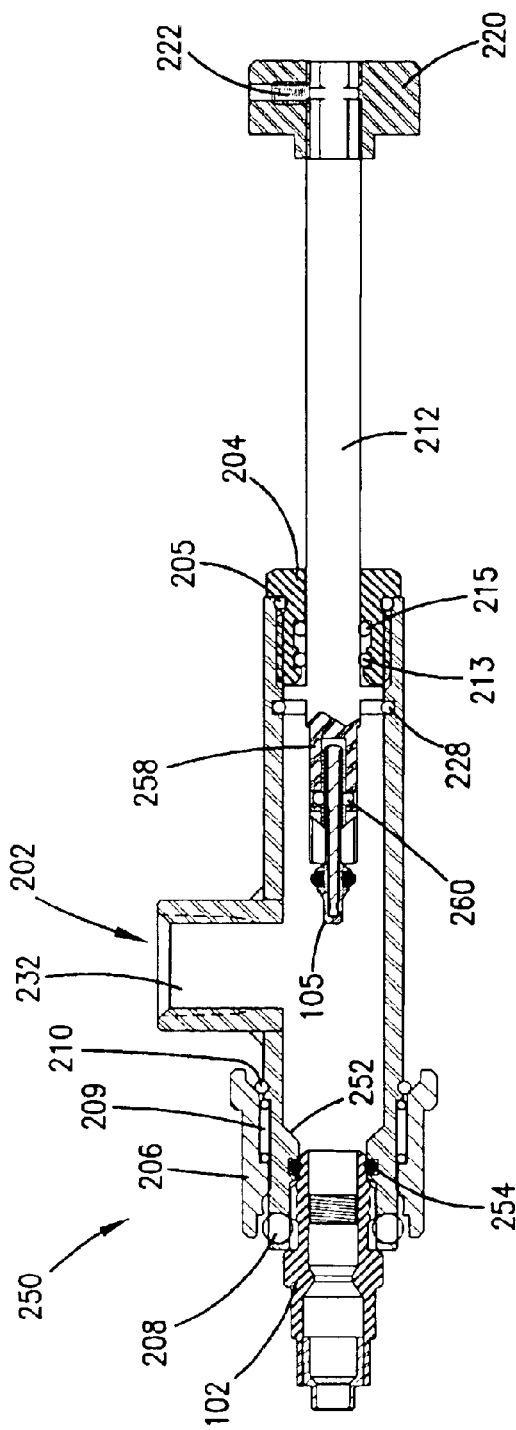
FIGS. 13A and 13B illustrate a tool for inserting a core into or removing a core from the service connection valve of FIG. 3.
Figure 13B:
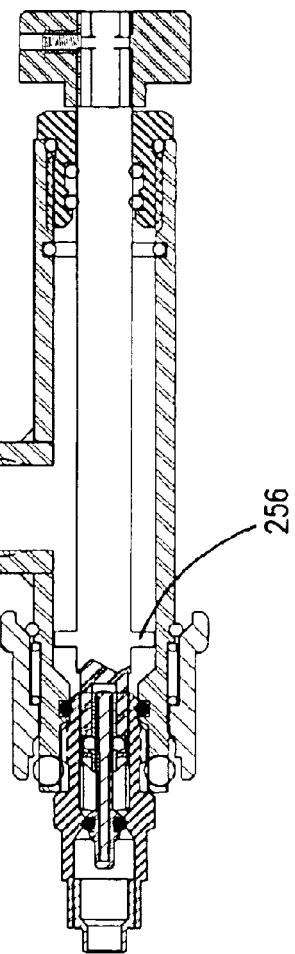

FIGS. 13A and 13B illustrate a service tool 250 that is used to insert the core, i.e. the valve assembly 104, of the service connection valve 100 of FIG. 3. Like the tool 200, the tool 250 can also be used to remove the core from the valve seat. The tool 250 is in many ways similar to the tool 200, and like elements will be referenced using the same reference numbers. One difference is that the body 202 is provided with an internal reduced diameter portion 252 provided with an o-ring seal 254 that seals with the exterior of the one-piece body 102. The threads on the exterior of the one-piece body engage the reduced diameter portion 252 and limits its insertion into the body.

Further, the shaft 212 is provided with a flange 256 adjacent a socket 258. The flange 256 cooperates with the locking o-ring 228 to retain the shaft 212 once it is pulled back, as shown in FIG. 13A. Further, the flange 256 slides along the inner surface of the body and stabilizes the shaft 212 during its movements.

The socket 258 is substantially smaller than the socket 214, as the socket is designed to receive and hold the valve stem 106 of the core. The socket 258 is provided with an internal o-ring 260 which surrounds and frictionally retains the stem 106 when it is inserted into the socket 258, as shown in FIG. 13A. Retainers other than an o-ring could be used as well.

The operation of the tool 250 is similar to the operation of the tool 200 and a detailed explanation of the operation of the tool 250 is therefore not necessary. It is to be understood that the torque tool (to be later described) is also used with the tool 250.

Valved Coupling

Figure 6:
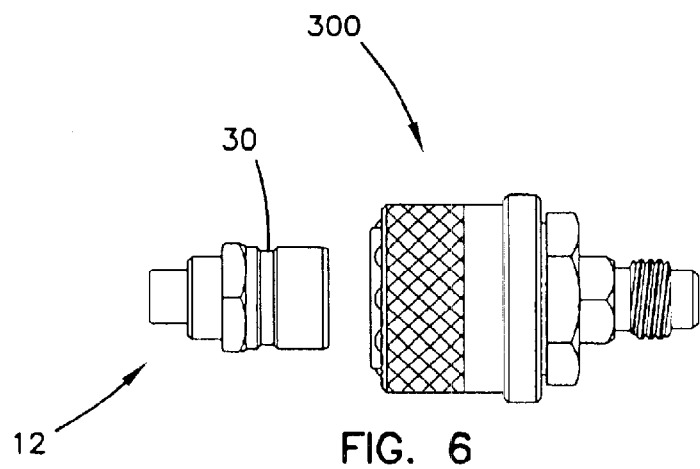
FIG. 6 illustrates a coupling using the valve of FIG. 2.
Figure 7:
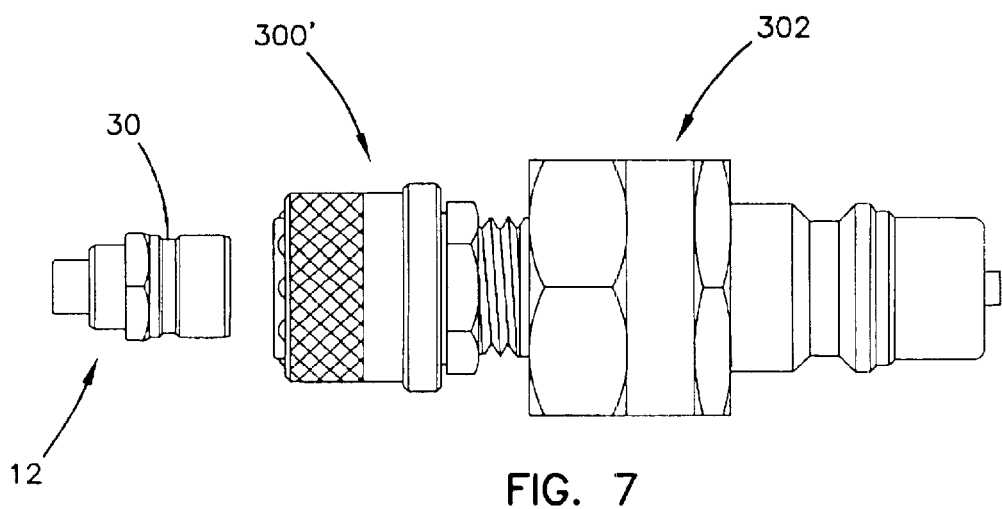
FIG. 7 illustrates a second embodiment of a coupling using an alternative valve.

FIG. 6 illustrates a coupling 300 that is provided with a core 17', such as the core (i.e. valve body and valve assembly) from the service connection valve of FIG. 2. Alternatively, FIG. 7 illustrates a coupling 300' with a National Pipe Thread NPT) 302 connected thereto, and a valved quick coupling, such as a Production Control Unit (PCU) valve or a Parker valve, connected to the NPT, to accommodate a hose or fitting. The couplings 300, 300' are designed to latch onto the valve seat 12 using latching balls 304 that engage in the detent groove 30 of the seat 12. The couplings 300, 300' provide a temporary valve for the seat 12 when the core 17 is not present.

Figure 8:
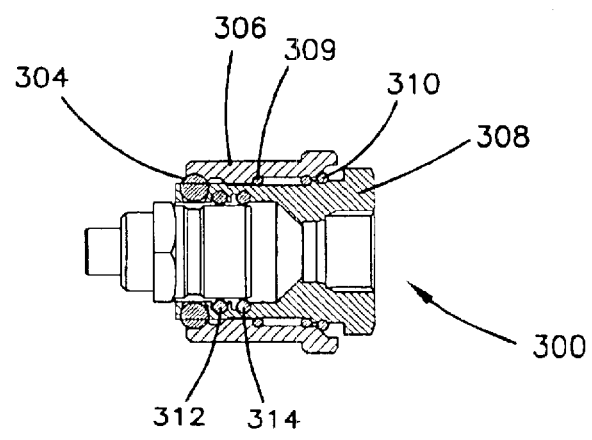
FIG. 8 is a cross-sectional view of the coupling of FIG. 6, with the valve removed, illustrating the details thereof.

FIG. 8 illustrates the details of the coupling 300, with the core 17' removed for clarity. The coupling 300 includes a connection means that is similar to the connection means in FIG. 4, including a sleeve 306 that is slideably disposed on a body 308 having first and second open ends and a flow path between the ends. The sleeve 306 is biased by a spring 309 toward a direction in which the balls 304 are forced by the sleeve 306 down into their respective holes. A retaining ring 310, disposed around the body 202, limits the rearward movement of the sleeve 306 on the body 308. In addition, a pair of seals 312, 314 disposed in grooves formed in the interior of the body 308 seal with the exterior surface of the seat 12 to prevent fluid leakage. The operation of the coupling 300 and how it connects to the seat 12 should be apparent from the discussion of the tools 200, 250, and further description of the operation is not provided.

It should be apparent that once the coupling 300 is connected to the seat 12, the valve core 17' in the coupling 300 valves the seat 12 and prevents escape of working fluid. Any processing operations can then be carried on through the coupling 300 by connecting a suitable processing line to the end of the valve core 17' by using a latching connector to engage the channel 41' or the threads 40'. Further, the hex head 38' is accessible for engagement by a corresponding hex on a tool as described herein. Connection of a processing line to the valve core opens the valve associated with the core to permit flow through the coupling 300. The coupling 300' is constructed and operates in similar fashion to the coupling 300.

Figure 14:
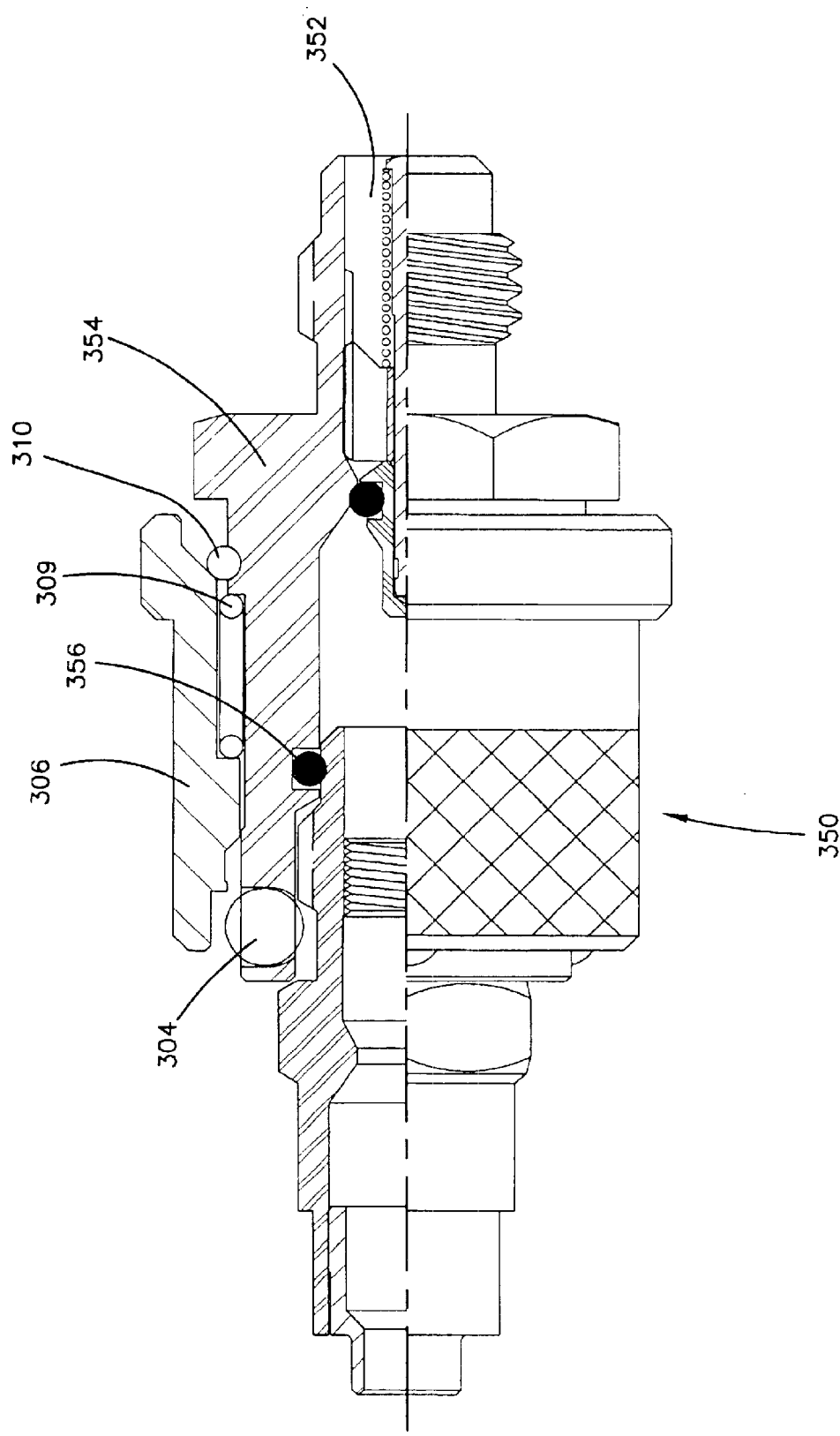
FIG. 14 illustrates a valved connector for use with the service connection valve of FIG. 3.

FIG. 14 illustrates a coupling 350 for use with the one-piece body 102 of the service connection valve 100 of FIG. 3. The coupling 350 is provided with a valve assembly 352, identical to the valve assembly 104, to control flow through the coupling 350. Alternatively, an arrangement as in FIG. 7 could be used on the coupling 350 in place of the valve assembly 352.

The coupling 350 is similar to the coupling 300 and similar elements will be referenced using the same reference numerals. The body 354 of the coupling 350 has a greater axial length than the body 308 of the coupling 300 to accommodate the valve assembly 352. A seal 356 seals with the exterior surface of the one-piece body 102. The latching balls 304 latch in the channel 120 behind the threaded section 118 on the exterior of the body 102. As an alternative to latching balls, a split collet assembly that latches onto or behind the threaded section 118 could be used as well.

Core Removal/Insertion Service Tool

FIGS. 9 and 10A–C illustrate a service tool 400 that is used to remove a core from the valve 10 in FIG. 2 while the system to which the valve 10 is attached is pressurized, as well as insert the core into the valve. As can be seen from FIGS. 9 and 10A–C, many elements of the tool 400 are substantially identical to elements of the tool 200, and like elements are referenced using the same reference numerals.

Because the tool 400 connects to a pressurized system, the tool 400 must be designed to prevent fluid escape from the system when the core is removed. To accomplish this, a ball valve 402 is disposed in the body 202. The ball 402 is rotatably supported by a pair of Teflon seats 404, 406 disposed in the body. A passage 407 is formed through the ball 402, with a first section 408 of the passage having a diameter that is sufficient to allow passage of the shoulder 221 and socket 214 when the axis of the section 408 is aligned with the axis of the shaft 212 and when the shaft 212 is pulled backward. A second section 410 of the passage is selectively alignable with the open end of the body 202 by rotating the ball 402, as illustrated in FIG. 10B.

Figure 9:
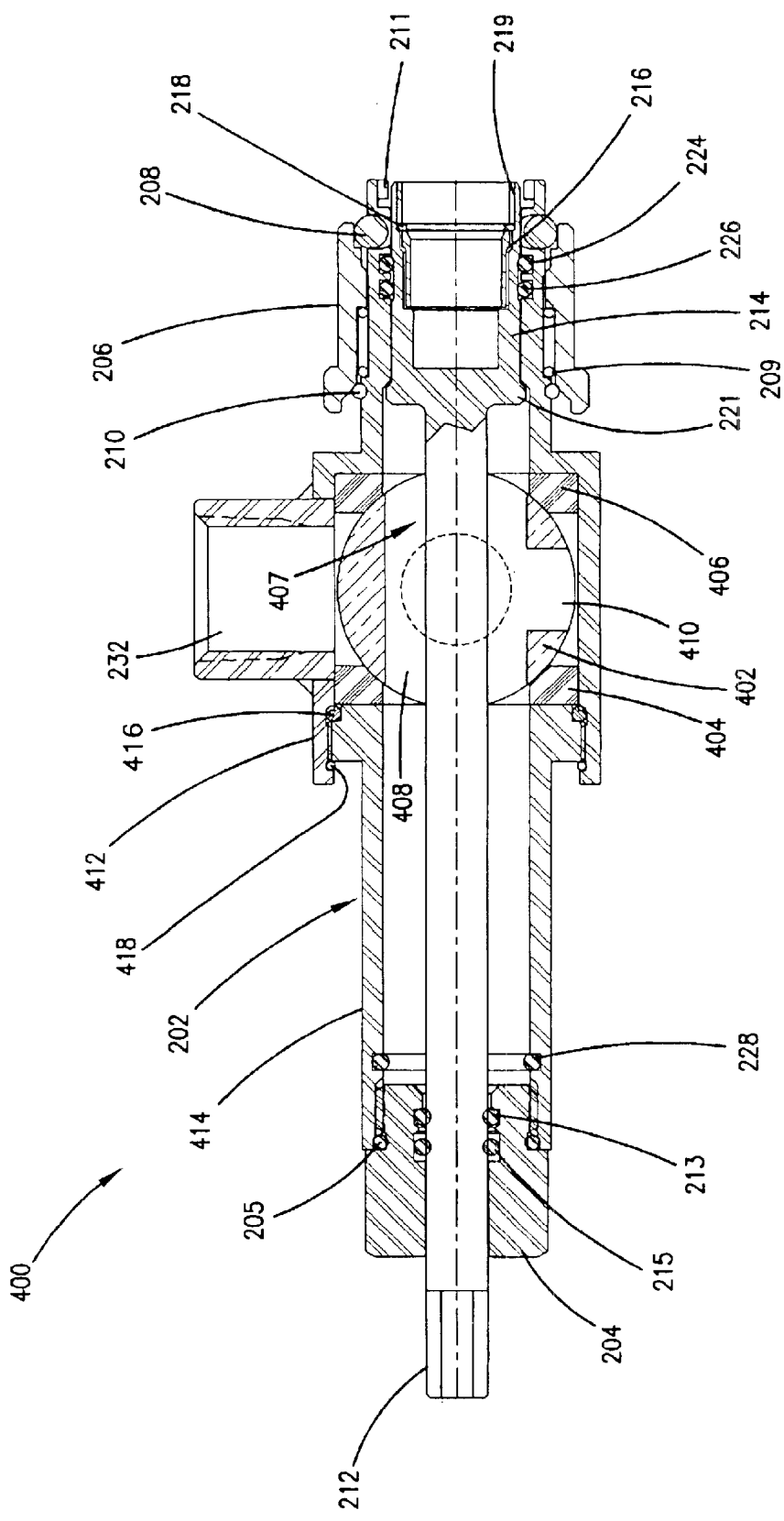
FIG. 9 is a cross-sectional view of a tool for removing a core from or inserting a core into the service connection valve of FIG. 2.
Figure 10A:
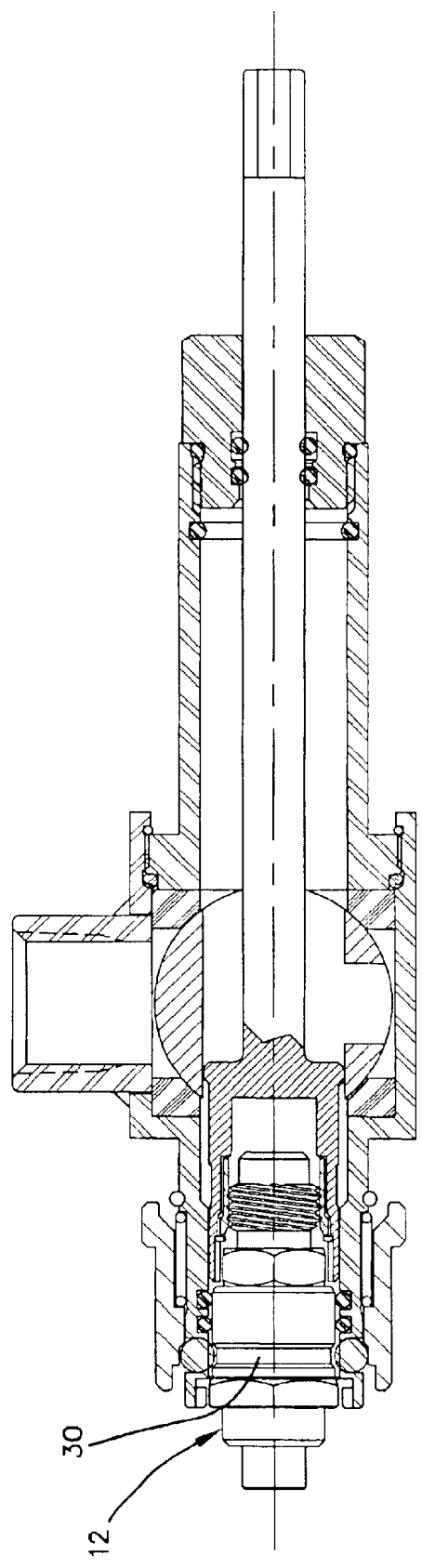
FIGS. 10A–C illustrate the operation of the tool of FIG. 9.
Figure 10B:
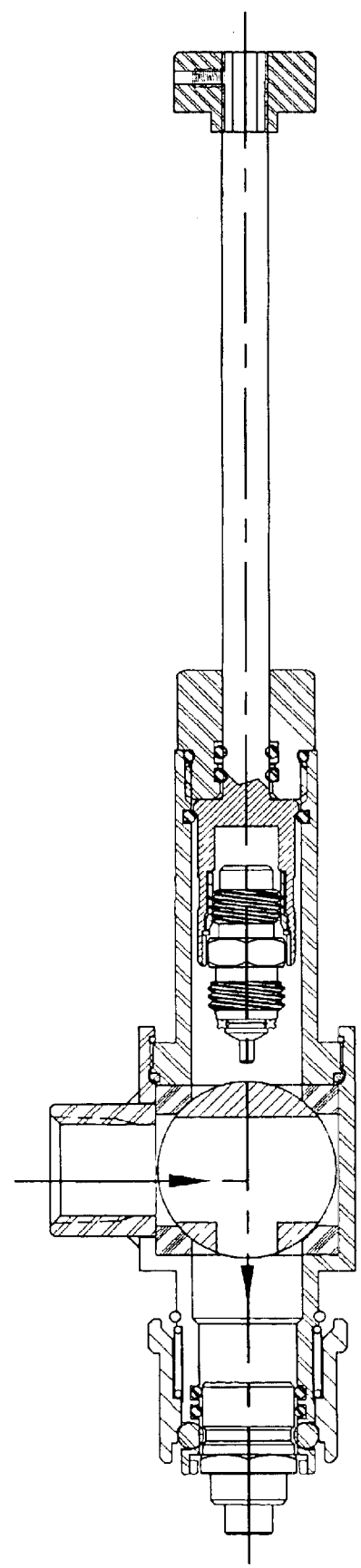

The ball 402 is connected to a handle (not shown) disposed exteriorly of the body 202 by which the ball is rotated between a first position, shown in FIG. 9, and a second position, shown in FIG. 10B. In the first position of the ball 402, flow through the tool 400 is prevented and the section 408 is generally aligned with the shaft 212. In the second position, the section 410 faces the open end of the body 202 while the section 408 communicates the port 232 with the open end of the body. The ball 402 is rotatable about an axis that is perpendicular to the shaft 212 and perpendicular to the axis of the port 232.

In the tool 400, the body 202 is comprised of a front body 412 and a rear body 414 detachably connected to the front body, preferably by threading the rear body 414 into the front body 412. The seats 404, 406 seal and prevent fluid leakage from between the front and rear bodies, and a snap ring 416 retains the seats 404, 406 within the front body. In addition, a clip 418 retains the rear body 414 within the front body 412. This construction permits assembly of the seats 404, 406 and ball 402 into the tool 400, as well as replacement of the seats and ball if the need arises.

Figure 10C:
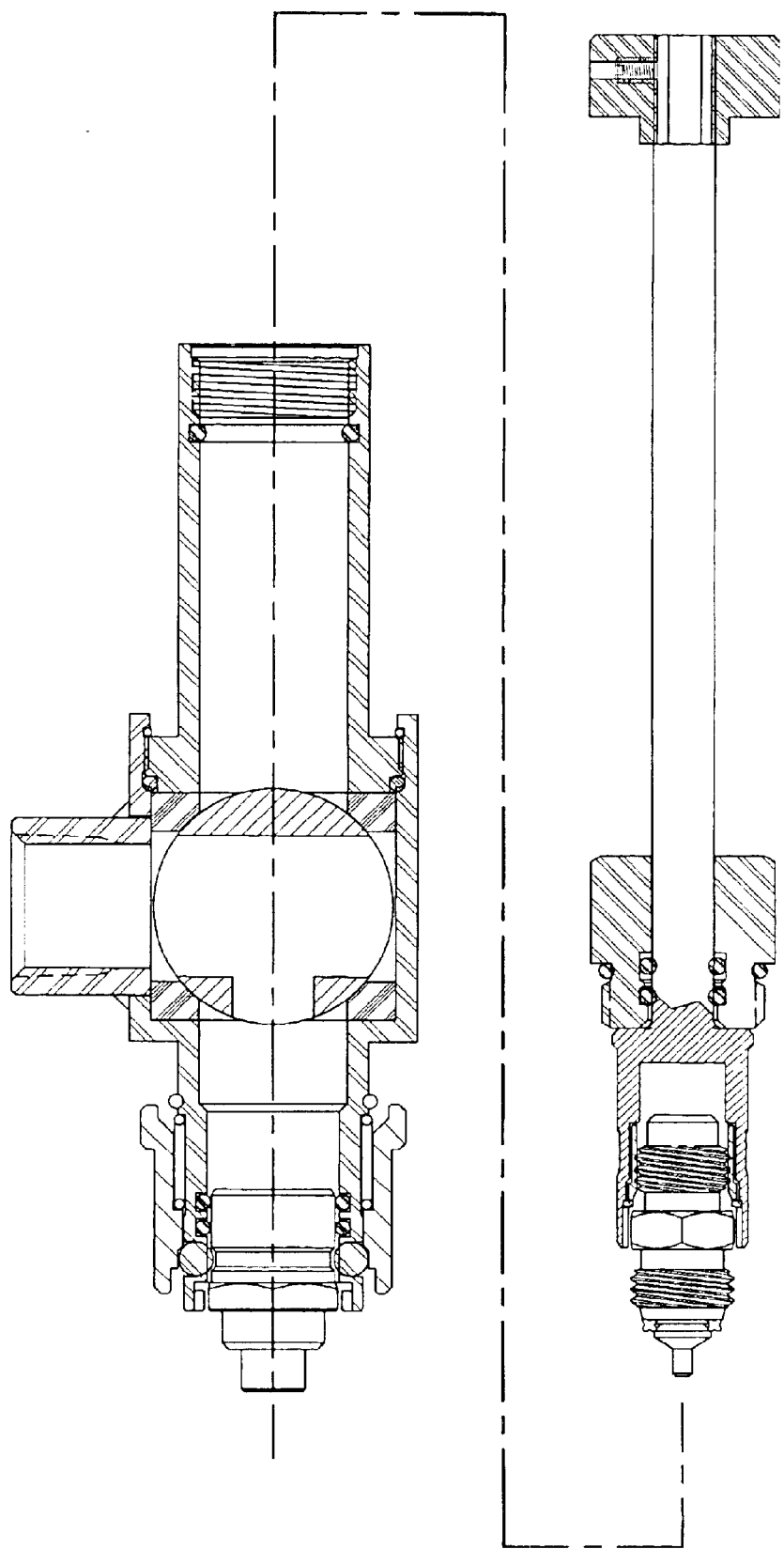

The operation of the tool 400 is illustrated in FIGS. 10A–C. As indicated, the tool 400 is designed for use with the valve 10 that is attached to a pressurized system. Initially, the tool 400 is attached to the valve 10, as shown in FIG. 10A, by latching onto the detent groove 30 of the seat 12. At this stage, the hex 211 engages the hex head 28 on the seat 12, the seals 224, 226 seal with the exterior of the seat 12, the drive hex 219 engages the hex head 38 on the body 14, and the collet 216 grips and retains the core. The knob is not attached to the shaft 212 to permit use of the torque tool, later described, to thread the core out of the seat 12. Once the core is threaded out, the shaft 212 is pulled backward, as shown in FIG. 10B, thereby pulling the core into the rear body 414. The ball valve 402 is then rotated 90 degrees to its second position to allow flow through the port 232 and into and through the seat 12. In this position, the ball valve 402 also closes off flow to the core disposed in the rear body 414. After the ball valve 402 is rotated, the shaft 212 along with the core held thereby can be removed from the tool 400 as shown in FIG. 10C. The core, either the same core or a new core, can thereafter be inserted by simply reversing the process used to remove the core.

Figure 15:
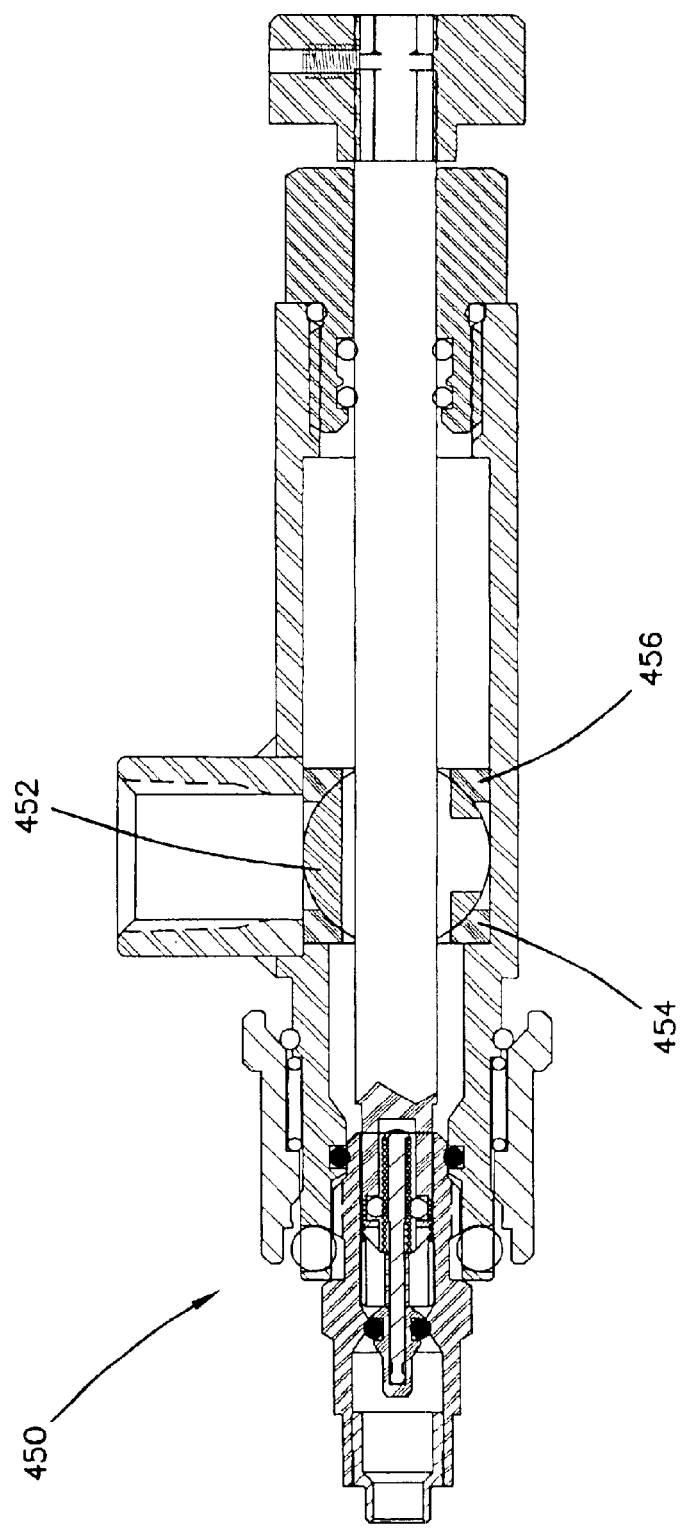
FIG. 15 illustrates a tool for removing a core from or inserting a core into the service connection valve of FIG. 3.

FIG. 15 illustrates a service tool 450 for removing the core from the service connection valve 100 of FIG. 3 as well as inserting the core into the valve 100. The tool 450 is substantially identical to the tool 250 of FIGS. 13A–B, and similar elements are referenced using the same reference numerals. However, the tool 450 includes a ball valve 452 and ball valve seats 454, 456 that are similar to the ball valve and valve seats in FIG. 9. Moreover, the shaft 212 is not provided with the flange 256 that was used in the embodiment of FIGS. 13A and 13B, to permit the shaft and the valve core held thereby to be pulled backward through the ball valve 452. The tool 450 functions similarly to the tool 400, and is therefore not further described.

Torque Tool

Figure 11:
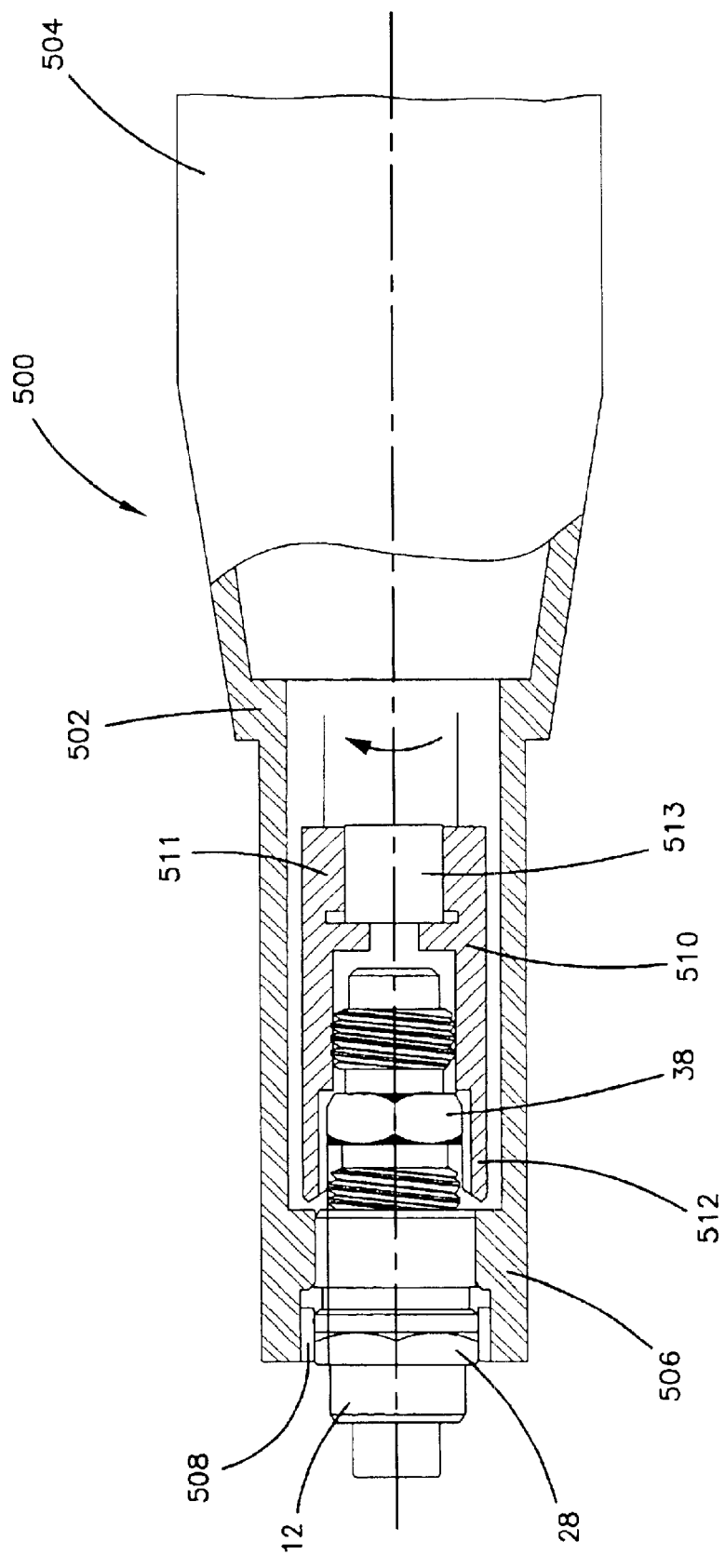
FIG. 11 illustrates a torque tool for removing or inserting a core of the service connection valve of FIG. 2.

FIG. 11 illustrates a tool 500 that is used to either insert a core into or remove a core from the valves 10 and 100. The tool 500 is not used with any of the tools 200, 250, 300, 350, 350, 400, 450. Instead, the tool 500 acts directly on the cores of the valves 10, 100. The tool 500 is designed to attach to a conventional pneumatic gun (not shown) or the like, and is operated by the pneumatic gun.

The tool 500 includes an elongated, generally cylindrical external holding head 502 with a first end region 504 that is designed to fit over the housing of the pneumatic gun to attach the head 502 to the gun, and an end region 506 that engages with the valve seat 12. The end region 506 includes an internal hex 508 that engages with the hex head 28 of the seat 12. The holding head 502, when attached to the pneumatic gun, holds the seat 12 against rotation.

The tool 500 further includes an elongated, generally cylindrical internal drive head 510 that is disposed longitudinally within the holding head 502. The drive head 510 includes an end 511 that connects to the drive element 513 on the pneumatic gun, preferably via a standard socket connection. Therefore, when the drive element 513 rotates, the drive head 510 is also rotated, with the holding head 502 remaining stationary. The other end of the drive head 510 is constructed as a socket having an internal diameter that is sized to permit the drive head 510 to slide over, and drive, the valve core. The socket of the drive head 510 includes an internal hex 512 that engages with the hex head 38 on the valve body 14, so that the valve core is able to be rotated by the drive head 510.

In use, the tool 500, which has been attached to the pneumatic gun, is fit onto the valve 10 as illustrated in FIG. 11. The gun is then actuated to rotate the drive head 510 to either insert or remove the valve core. A pneumatic gun, as is known in the art, typically includes a selector to permit the drive element of the gun to rotate in a first or second direction. Therefore, rotation of the drive head 510 in one direction will cause the valve core to be threaded into the valve seat 12, while rotation of the drive head in the opposite direction causes the valve core to be unthreaded from the valve seat. Because the holding head 502 holds the seat 12, no torque is transferred to the operator of the pneumatic gun or to the joint between the seat 12 and the product to which the seat 12 is connected.

FIGS. 12A–B illustrates another torque tool 550 that attaches to a pneumatic gun or the like and which is designed for use with a core insertion or removal tool, such as the tools 200, 250, 400, 450. The tool 550 includes an external holding head 552 that has an internal hex 554 designed to engage with a hex 556 formed on the exterior of the body of the insertion or removal tool. The tool 550 also includes an internal drive head 558 that is driven by the drive element 559 of the pneumatic gun. The drive head 558 includes a socket 560 that is designed to engage with, and drive, the end of the shaft 212 from which the knob 220 has been removed. In operation, the holding head 552 holds the tool body while the drive head 558 drives the shaft 212, and no torque is transferred to the operator of the pneumatic gun or to the joint of the seat 12.

Processing and System Operation

Figure 1:
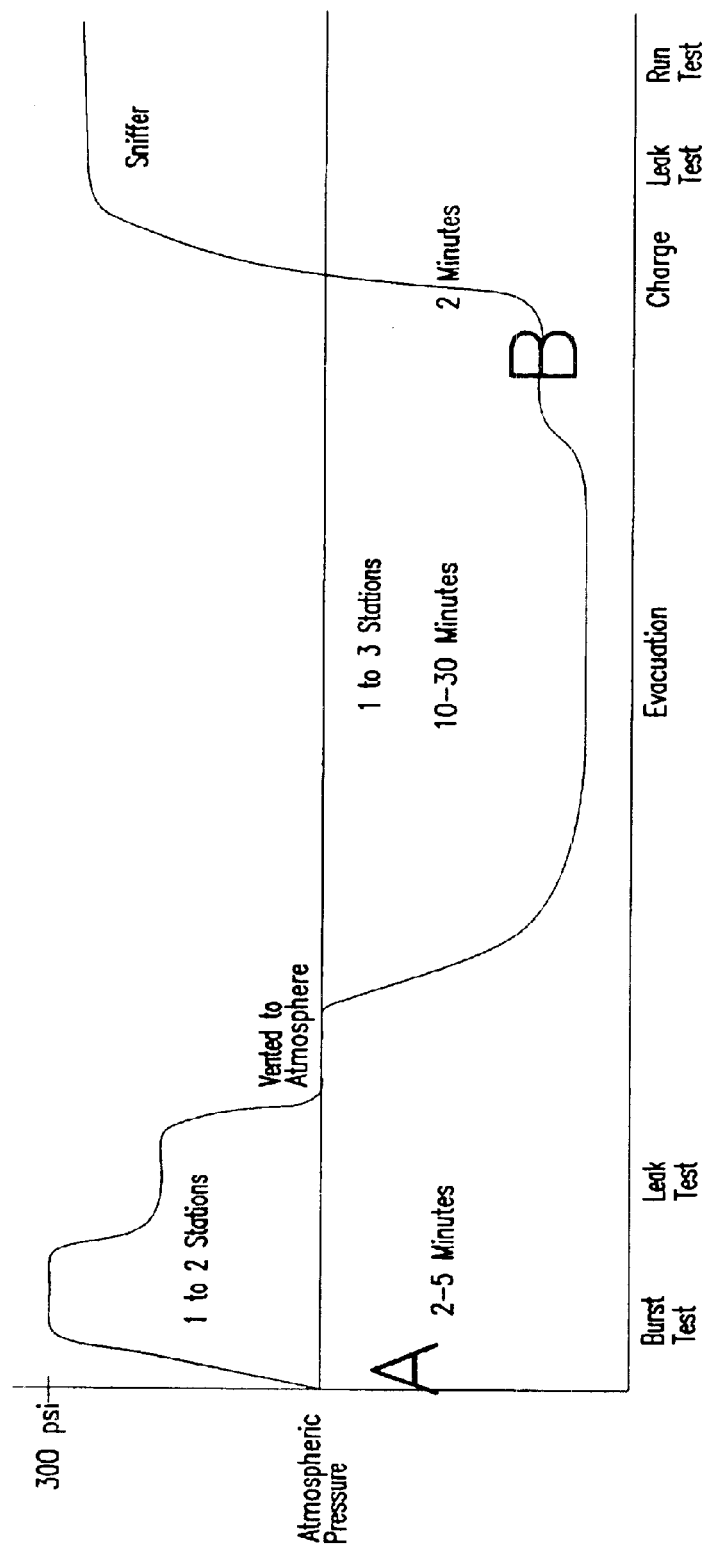
FIG. 1 illustrates a typical process that a cooling system of a refrigeration product undergoes during manufacturing.

Referring once again to FIG. 1, it was earlier described herein that the processes and tests shown therein are often performed at separate stations. A typical process flow that a refrigeration product undergoes is as follows:

Station 1⇒ Burst Test
Station 2⇒ Rough Leak test
⇒ Vent to Atmosphere
Station 3⇒ Rough Evacuation
Station 4⇒ Final Evacuation
Station 5⇒ System Charged (with refrigerant)
Station 6⇒ Leak Test
Station 7⇒ Run Test The system of the invention will be described in relation to this typical process flow. It is to be realized that the process is exemplary, and that the system of the invention could be used with other process flows. Given this typical process flow, there are at least three different scenarios by which the system of the invention could be utilized.

Scenario 1

At station 1, a valve core is inserted into the tool 200, 250. The tool is then attached to the valve seat 12 (or body 102) which has been previously affixed to the refrigeration product. The tool stays with the product through station 4. Therefore, the burst test, the rough leak test and venting to atmosphere, the rough evacuation and the final evacuation all occur with the tool 200, 250 in place, and any fluid flow occurs through the port 232. In this scenario, a valved quick connection, such as a PCU or a Parker valve, must be connected to the port 232 to prevent flow therethrough while the product moves between stations, and to permit connection with a processing line at each station. After the final evacuation is finished, the valve core is inserted into the seat using the tool 200, 250 and the torque tool 550, and the tool is then removed. The product, which is now valved by a complete valve 10, 100, proceeds to station 5 where it is filled with refrigerant. Preferably, the refrigerant processing line at station 5 is provided with a connector to permit connection to the valve 10, 100. A suitable connector is disclosed in U.S. Pat. No. 6,039,303. As described in this patent, the connector is designed to latch onto the valve and open the valve assembly within the valve. Once the system is charged with refrigerant, the product proceeds to stations 6 and 7 for a leak test and run test, respectively. No tools of the system are used at stations 6 and 7. However, at station 7, a connector, such as a connector disclosed in U.S. Pat. No. 6,039,303, is used to connect to the system for monitoring parameters such as pressure and temperature during the run test.

A benefit provided by this scenario is that maximum flow is achieved at every station. Notably, when the valve core is removed from the valve seat, flow occurs through the valve seat unrestricted by the valve core. Further, when the valve core is inserted, the high flow benefits provided by the valves 10, 100 are achieved. Another benefit of this scenario is that if the rough evacuation and final evacuation are at different stations, there is no loss in vacuum as the product moves from station 3 to station 4.

Scenario 2

At station 1, a connector, such as the coupling 300 of FIG. 6, is attached to the valve seat 12 (or body 102) which has been previously affixed to the refrigeration product. Using an additional connector, such as the connector in U.S. Pat. No. 6,039,303, the burst test is performed. The coupling 300 then stays with the product through station 2. After station 2, the coupling 300 is removed and the system is allowed to vent to atmosphere. The product then proceeds to a station that combines the evacuations of stations 3 and 4 mentioned above. The tool 200, 250 is attached to the seat 12 at this station, and evacuation occurs through the port 232, to provide maximum flow into and out of the system. Once evacuation is complete, the valve core is installed using the tool 200, 250 and the tool 550. After the valve core is installed, the product is moved to station 5 for charging. Again, a connector from U.S. Pat. No. 6,039,303 can be used to perform the charging. After charging, the product proceeds to stations 6 and 7 for further processing as in scenario 1.

A benefit provided by this scenario is that maximum flow is achieved during evacuation. The evacuation requires the most amount of time to complete, and therefore increasing flow rate permits a reduction in evacuation time. In addition, the only tool that moves with the product down the processing line is the coupling 300. Since each product has a coupling 300 in this scenario, a relatively large number of couplings at station 1 are needed. However, the coupling 300 is a relatively inexpensive tool, and therefore it is more economically feasible to have the large quantity of couplings 300 that are needed at station 1.

Scenario 3

At station 1, a valve 10, 100 is inserted, using the tool 200, 250, into the valve seat 12 (or body 102) which has been attached to the product. The core of the valve is then torqued into the seat using the tool 500. A connector, such as a connector disclosed in U.S. Pat. No. 6,039,303, is present at station 1 to connect to the valve to perform the burst test. Likewise, stations 2–5 each include a connector like that disclosed in U.S. Pat. No. 6,039,303 to perform their respective processing. After charging, the product proceeds to stations 6 and 7 for further processing as in scenario 1.

A benefit of this scenario is that none of the tools of the system move with the product down the processing line. Therefore, numerous tools are not required.

In each of scenarios 1, 2 and 3, the tool 400 or 450 could be used in place of the tool 200, 250. Use of the tool 400, 450 would also be required if there is a leak in the valve core and the core requires replacement. This could occur either during manufacturing, such as during the processing at one of the stations 1–7, or in the field during use of the product.

Further, use of the tool 550 would be required any time the valve core is inserted into the seat 12 using the tool 200, 250, 400, 450. In contrast, the tool 500 would be used any time the valve core is directly inserted into the valve seat 12 without any additional tools, such as by hand. Hand tools, such as wrenches and the like, could also be used to insert the valve core into the valve seat.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for performing processing operations on a closed loop fluid system, comprising:
   a service connection valve adapted to be connected to the closed loop, fluid system, the service connection valve including a valve seat adapted to be fixed to the closed loop fluid system and a valve core that is adapted to be removably connectable to said valve seat, and said valve seat includes an exterior surface portion comprising a detent groove to permit connection with a latching connector; and
   a service tool that is connectable with said valve seat, said service tool including:
   a) a latching connector that is engageable with said exterior surface portion for connecting said service tool to said valve seal;
   b) a removal/insertion mechanism that is capable of engaging said valve core so as to permit removal of said valve core from, or insertion of said valve core into, said valve seat; and
   c) a port through which fluid flow can occur.

2. A system according to claim 1, wherein said valve core comprises a valve body adapted to be detachably connected to said valve seat, and a valve assembly connected to said valve body.

3. A system according to claim 2, wherein said valve assembly is detachably connected to said valve body.

4. A system according to claim 1, wherein said valve seat comprises a one-piece body, and said valve core comprises a valve assembly adapted to be detachably connected to said one-piece body.

5. A system according to claim 1, wherein said latching connector comprises a latching ball connector.

6. A system according to claim 1, wherein said exterior surface portion comprises threads.

7. A system according to claim 1, wherein said valve seat comprises a hex head, and said latching connector comprises a generally hollow body with an open end having a hex that is engageable with said hex head.

8. A system according to claim 7, wherein said valve core includes a hex head, and said removal/insertion mechanism includes a drive hex that is engageable with said hex head on said valve core.

9. A system according to claim 1, wherein said service tool further includes a valve for controlling fluid flow therethrough.

10. A system according to claim 1, wherein said removal/insertion mechanism includes a split collet assembly or gripping said valve core.

11. A service tool for connecting to a valve seat and removing/inserting a valve core from/into the valve seat, comprising:
   a generally hollow body having an open end, a closed end, and a port positioned between the open and closed ends;
   a latching connector connected to said body adjacent the open end thereof to releasably connect said body to the valve seat, wherein said latching connector comprises a latching ball connector; and
   a removal/insertion mechanism disposed within said body, said removal/insertion mechanism being movable within said hollow body along a longitudinal axis of said body between a first position adjacent the open end and a second position adjacent the closed end of said body.

12. A service tool according to claim 11, wherein said removal/insertion mechanism comprises a socket that is designed to hold and retain said valve core.

13. A service tool according to claim 12, further including a shaft connected to said socket, said shaft is oriented parallel to the longitudinal axis and extends through the closed end of said body to the exterior thereof.

14. A service tool according to claim 12, further including a valve mounted in said body between the open end and said port, said valve is mounted for movement between a first position which prevents fluid communication between the open end and said port and a second position which permits fluid communication between the open end and said port.

15. A service tool according to claim 14, wherein said valve includes a passage therethrough that is sized to permit passage of said socket therethrough when said valve is at the first position.

16. A service tool according to claim 11, wherein said open end of said body has a hex.

17. A service tool according to claim 16, wherein said removal/insertion mechanism includes a drive hex.

18. A service tool according to claim 12, wherein said socket includes a split collet assembly disposed therein.

19. A service tool for connecting to a valve seat and removing/inserting a valve core from/into the valve seat, comprising:
   a generally hollow body having an open end, a closed end, and a port positioned between the open and closed ends;
   a connector connected to said body adjacent the open end thereof to connect said body to the valve seat; and
   a removal/insertion mechanism disposed within said body, said removal/insertion mechanism being movable within said hollow body along a longitudinal axis of said body between a first position adjacent the open end and a second position adjacent the closed end or said body, said removal/insertion mechanism including a split collet assembly for gripping the valve core.

20. A service tool according to claim 19, wherein said open end of said body has a hex.

21. A service tool according to claim 20, wherein said removal/insertion mechanism further includes a drive hex.

22. A service tool for connecting to a valve seat and removing/inserting a valve core from/into the valve seat, comprising:
   a generally hollow body having an open end, a closed end, and a port positioned between the open and closed ends, said open end of said body having a hex;
   a connector connected to said body adjacent the open end thereof to connect said body to the valve seat; and
   a removal/insertion mechanism disposed within said body, said removal/insertion mechanism being movable within said hollow body along a longitudinal axis of said body between a first position adjacent the open end and a second position adjacent the closed end of said body, and said removal/insertion mechanism further includes a drive hex.

23. A method of performing processing operations on a closed loop fluid system, comprising:
   attaching a service connection valve to the closed loop fluid system, the service connection valve including a valve seat fixed to the closed loop fluid system and a valve core that is removably connected to said valve seat, and said valve seat includes an exterior surface portion that is adapted to permit connection with a latching connector;
   latching a service tool to said valve seat using a latching connector, said service tool including a removal/insertion mechanism that is capable of engaging said valve core so as to permit removal of said valve core from, or insertion of said valve core into, said valve scat;
   removing said valve core from said valve seat using said removal/insertion mechanism of said service tool; and
   performing a processing operation on the closed loop fluid system through said valve seat.

24. A method according to claim 23, wherein said service tool further includes a valve that is mounted for movement between a first position where flow through said tool is prevented and a second position where flow through said tool is permitted, and wherein removing said valve core occurs when said valve is in the first position and the processing operation is performed when said valve is in the second position.

25. A method according to claim 23, further including inserting said valve core back into said valve seat using said service tool after charging or evacuating.

26. A coupling for conducting servicing operations through a valve seat, comprising:
   a body having first and second open ends and a flow path extending through said body between the first and second ends;
   a latching connector associated with the first open end of said body to latch said body to the valve seat; and
   a valve core associated with the second open end of said body controlling flow through said second open end, said valve core includes a portion thereof that projects beyond the second open end, and the portion of said valve core that projects beyond the second open end includes an exterior surface with a detent groove and threads adjacent the detent groove.

27. A coupling according to claim 26, wherein said valve core is detachably connected to said body within the second open end thereof, and the portion of said valve core that projects beyond the second open end further includes a hex head on the exterior surface adjacent the detent groove.

28. A system for performing processing operations on a closed loop fluid system, comprising:

a service connection valve adapted to be connected to the closed loop fluid system, the service connection valve including a valve seat adapted to be fixed to the closed loop fluid system and a valve core that is adapted to be removably connectable to said valve seat, and said valve seat includes an exterior surface portion that is adapted to permit connection with a latching connector; and a service tool that is connectable with said valve seat, said service tool including:
 a) a latching connector that is engageable with said exterior surface portion for connecting said service tool to said valve seat, said latching connector comprising a latching ball connector;
 b) a removal/insertion mechanism that is capable of engaging said valve core so as to permit removal of said valve core from, or insertion of said valve core into, said valve seat; and
 c) a port through which fluid flow can occur.

29. A system for performing processing operations on a closed loop fluid system, comprising:

a service connection valve adapted to be connected to the closed loop fluid system, the service connection valve including a valve seat adapted to be fixed to the closed loop fluid system and a valve core that is adapted to be removably connectable to said valve seat, and said valve seat includes an exterior surface portion that is adapted to permit connection with a latching connector; and a service tool that is connectable with said valve seat, said service tool including:
 a) a latching connector that is engageable with said exterior surface portion for connecting said service tool to said valve seat;
 b) a removal/insertion mechanism that is capable of engaging said valve core so as to permit removal of said valve core from, or insertion of said valve core into, said valve seat, said removal/insertion mechanism includes a split collet assembly for gripping said valve core; and
 c) a port through which fluid flow can occur.

30. A service tool for connecting to a valve seat and removing/inserting a valve core from/into the valve seat, comprising:

a generally hollow body having an open end, a closed end, and a port positioned between the open and closed ends;

a latching connector connected to said body adjacent the open end thereof to releasably connect said body to the valve seat; and a removal/insertion mechanism disposed within said body, said removal/insertion mechanism being movable within said hollow body along a longitudinal axis of said body in between a first position adjacent the open end and a second position adjacent the closed end of said body, wherein said removal/insertion mechanism comprises a socket that is designed to hold and retain said valve core, and said socket includes a split collet assembly disposed therein.

* * * * *